(12) United States Patent
Krappé et al.

(10) Patent No.: US 10,621,640 B2
(45) Date of Patent: Apr. 14, 2020

(54) AUGMENTED AND VIRTUAL REALITY QUOTE-TO-CASH SYSTEM

(71) Applicant: Apttus Corporation, San Mateo, CA (US)

(72) Inventors: Kirk G. Krappé, Menlo Park, CA (US); Neehar Giri, Saratoga, CA (US); Vibhor Gaur, Foster City, CA (US)

(73) Assignee: Apttus Corporation, San Mateo, CA (US)

( * ) Notice: Subject to any disclaimer, the term of this patent is extended or adjusted under 35 U.S.C. 154(b) by 306 days.

(21) Appl. No.: 15/722,131

(22) Filed: Oct. 2, 2017

(65) Prior Publication Data

US 2018/0096406 A1 Apr. 5, 2018

Related U.S. Application Data

(60) Provisional application No. 62/403,582, filed on Oct. 3, 2016.

(51) Int. Cl.
*G06Q 30/06* (2012.01)
*G06Q 30/02* (2012.01)
(Continued)

(52) U.S. Cl.
CPC ......... *G06Q 30/0621* (2013.01); *G06F 3/011* (2013.01); *G06Q 30/0281* (2013.01);
(Continued)

(58) Field of Classification Search
None
See application file for complete search history.

(56) References Cited

U.S. PATENT DOCUMENTS

| 5,960,407 | A | 9/1999 | Vivona |
| 6,473,084 | B1 | 10/2002 | Phillips et al. |

(Continued)

FOREIGN PATENT DOCUMENTS

| CN | 1315705 A | * 10/2001 |
| EP | 3073421 | 9/2016 |

(Continued)

OTHER PUBLICATIONS

Machine translation of Chinese patent document CN1315705A, obtained by U.S. Patent Office, Jan. 8, 2010 (Year: 2020).*

(Continued)

*Primary Examiner* — Nicholas D Rosen
(74) *Attorney, Agent, or Firm* — Lessani Law Group, PC

(57) ABSTRACT

This disclosure relates to a system, method, and computer program that enables users to initiate quote-to-cash system actions and receive quote-to-cash system output via a virtual/augmented reality interface. A virtual reality client device provides a virtual/augmented reality user interface via which the user can initiate one of a plurality of quote-to-cash action requests, such as requesting a quote or configuring a product. In response to the user selecting a quote-to-cash action, the client device displays a virtual/augmented scene with graphical images that correspond to parameters of a quote-to-cash action. The user is able to specify parameters for the quote-to-cash action by interacting with these images in the virtual/augmented reality scene. The client device then calls the quote-to-cash system with the specified parameters, as determined by the user's interaction with virtual/augmented reality scene, and receives a quote-to-cash output from the quote-to-cash system, which is subsequently reflected in the virtual/augmented reality scene.

18 Claims, 10 Drawing Sheets

(51) Int. Cl.
*G06F 3/01* (2006.01)
*G06T 19/00* (2011.01)

(52) U.S. Cl.
CPC ..... *G06Q 30/0283* (2013.01); *G06Q 30/0611* (2013.01); *G06T 19/003* (2013.01); *G06T 19/006* (2013.01)

(56) References Cited

U.S. PATENT DOCUMENTS

| | | | |
|---|---|---|---|
| 7,328,177 B1* | 2/2008 | Lin-Hendel | G06Q 30/02 705/26.7 |
| 7,574,381 B1* | 8/2009 | Lin-Hendel | G06F 3/04815 705/26.9 |
| 7,725,358 B1* | 5/2010 | Brown | G06Q 30/00 705/26.4 |
| 8,498,954 B2 | 7/2013 | Malov et al. | |
| 8,644,842 B2 | 2/2014 | Arrasvuori et al. | |
| 9,519,907 B2* | 12/2016 | Carter, III | G06Q 10/063 |
| 10,289,261 B2* | 5/2019 | Aggarwal | H04L 67/38 |
| 10,521,491 B2* | 12/2019 | Krappe | G06F 17/18 |
| 2002/0040332 A1* | 4/2002 | Maari | G06Q 10/087 705/26.5 |
| 2003/0033240 A1 | 2/2003 | Balson et al. | |
| 2006/0100912 A1 | 5/2006 | Kumar et al. | |
| 2007/0016536 A1* | 1/2007 | Mirlas | G06Q 30/0283 705/400 |
| 2007/0039209 A1* | 2/2007 | White | A43B 3/26 36/97 |
| 2007/0087756 A1 | 4/2007 | Hoffberg | |
| 2007/0162373 A1 | 7/2007 | Kongtcheu | |
| 2008/0046355 A1* | 2/2008 | Lo | G06Q 30/00 705/37 |
| 2008/0091551 A1* | 4/2008 | Olheiser | G06Q 30/0603 705/26.5 |
| 2009/0048937 A1* | 2/2009 | Contreras | G06Q 30/0603 705/26.4 |
| 2009/0222319 A1 | 9/2009 | Cao et al. | |
| 2009/0234710 A1 | 9/2009 | Belgaied Hassine et al. | |
| 2009/0327166 A1* | 12/2009 | Carter, III | G06Q 10/063 705/500 |
| 2010/0179859 A1* | 7/2010 | Davis | G06Q 30/02 705/14.4 |
| 2010/0262478 A1 | 10/2010 | Bamborough et al. | |
| 2010/0306120 A1 | 12/2010 | Ciptawilangga | |
| 2012/0173384 A1 | 7/2012 | Herrmann et al. | |
| 2012/0221410 A1 | 8/2012 | Bennett et al. | |
| 2012/0246035 A1* | 9/2012 | Cross | G06Q 30/06 705/27.1 |
| 2012/0254092 A1 | 10/2012 | Malov et al. | |
| 2013/0103391 A1 | 4/2013 | Millmore et al. | |
| 2013/0132273 A1 | 5/2013 | Stiege et al. | |
| 2014/0025529 A1* | 1/2014 | Honeycutt | G06Q 30/0621 705/26.5 |
| 2014/0149273 A1 | 5/2014 | Angell et al. | |
| 2015/0120526 A1 | 4/2015 | Peterffy et al. | |
| 2015/0142704 A1 | 5/2015 | London | |
| 2015/0309705 A1* | 10/2015 | Keeler | G06F 3/011 705/27.2 |
| 2015/0378156 A1* | 12/2015 | Kuehne | G06F 3/012 345/8 |
| 2016/0034923 A1 | 2/2016 | Majumdar et al. | |
| 2017/0068670 A1 | 3/2017 | Orr et al. | |
| 2017/0124176 A1 | 5/2017 | Beznos et al. | |
| 2017/0124655 A1 | 5/2017 | Crabtree et al. | |
| 2017/0351241 A1 | 12/2017 | Bowers et al. | |
| 2017/0358024 A1* | 12/2017 | Mattingly | G06F 3/041 |
| 2018/0005208 A1* | 1/2018 | Aggarwal | H04L 67/38 |
| 2018/0293640 A1* | 10/2018 | Krappe | G06Q 30/0633 |
| 2018/0349324 A1* | 12/2018 | Krappe | G06F 17/18 |

FOREIGN PATENT DOCUMENTS

| | | |
|---|---|---|
| JP | 2001290977 | 10/2001 |
| JP | 2017146909 | 8/2017 |
| WO | 0052605 | 9/2000 |
| WO | 03003146 | 1/2003 |

OTHER PUBLICATIONS

Oracle: Automating the Quote-to-Cash Process: An Oracle White Paper, Jun. 2009, pp. 1-19, 2009.

Microsoft/APTTUS: Ultimate Guide to Quote-To-Cash for Microsoft Customers, Web Archives, Oct. 1, 2015, pp. 1-28.

Wainwright, Phil, "Salesforce, Microsoft quote-to-cash partner Apttus raises $88m", Sep. 29, 2016, pp. 1-7.

Riggins, J., "Interview Quote-to-Cash Pioneers Apttus Links Leads to Revenue", May 21, 2014, pp. 1-7.

Wainwright, Phil, Apttus Applies Azure Machine Learning to Quote-to-Cash, Apr. 3, 2016, pp. 1-5.

* cited by examiner

AUGMENTED AND VIRTUAL REALITY QUOTE-TO-CASH SYSTEM

RELATED APPLICATIONS

This application claims the benefit of U.S. Provisional Application No. 62/403,582, filed on Oct. 3, 2016, and titled "Augmented and Virtual Reality Product Configuration," the contents of which are incorporated by reference herein as if fully disclosed herein.

BACKGROUND OF THE INVENTION

1. Field of the Invention

This invention relates generally to quote-to-cash systems that provide product configuration and other sell-side functionality, and, more specifically, to enabling users to interact with a quote-to-cash system via a virtual reality interface.

2. Description of the Background Art

Quote-to-cash systems integrate and automate end-to-end sell-side processes, from creating a quote for a prospective customer to collecting revenue and managing renewals. For example, quote-to-cash systems facilitate sales transactions by enabling users to configure products, price products, generate quotes, provide product recommendations, create and sign contracts, manage billings, and perform other sell-side business functions. Many quote-to-cash systems are offered as software-as-a-service (SasS) applications, and some run on or in connection with customer relationship management (CRM) systems.

Traditionally, users access a quote-to-cash system via a user interface specific to the quote-to-cash system or an associated CRM system. For example, a user may log into a web interface or access the quote-to-cash system via a dedicated application on a mobile device. Via the user interface, users specify parameters for a quote-to-cash action. For example, for a product quote, the user may specify the entity name, the base product, any configurable product options, the quantity ordered, and the discount amount. In some cases, users would benefit from being able to select parameters for a quote-to-cash action in a virtual/augmented reality scene that provides more context for the action. While some 3D product configuration tools are known, such solutions do not enable a user to seamlessly interface with a remote quote-to-cash system and access a variety of quote-to-cash actions. Therefore, there is market demand for a solution that enables a user to access a quote-to-cash system via a virtual or augmented reality interface in addition to the conventional web and mobile interfaces.

SUMMARY OF THE DISCLOSURE

The present disclosure relates to a system, method, and computer program that enables users to initiate quote-to-cash system actions and receive quote-to-cash system output via a virtual/augmented reality interface. A virtual reality client device provides a virtual/augmented reality user interface via which the user can log into a quote-to-cash system and initiate one of a plurality of quote-to-cash actions, such as requesting a quote, configuring a product, receiving approval for a quote, requesting a contract, and asset-based ordering. In response to the user selecting a particular quote-to-cash action, the virtual reality client device displays a virtual/augmented reality scene with scene elements (i.e., images in the scene) that correspond to parameters of a quote-to-cash action. For example, for a product configuration, the scene elements correspond to configurable options.

The user is able to specify parameters for the quote-to-cash action by interacting with scene elements in the virtual/augmented reality user interface. In response to the virtual reality client device detecting a selection of one or more scene elements by the user, the client device identifies one or more quote-to-cash parameters corresponding to the selected scene element(s). The virtual reality client device then calls the quote-to-cash system with a quote-to-cash action request and the one or more identified parameters.

The quote-to-cash system generates a quote-to-cash output in response to the call, and provides the output to the virtual reality client device. The virtual reality client device updates the virtual reality scene to reflect the quote-to-cash output.

DETAILED DESCRIPTION OF THE PREFERRED EMBODIMENTS

The present disclosure relates to a system, method, and computer program that enables users to initiate quote-to-cash system actions and receive quote-to-cash system output via a virtual/augmented reality interface. For convenience, the terms "virtual reality" or "VR" refer hereinafter to either augmented reality or virtual reality.

In one embodiment, a quote-to-cash system is any system that performs at least one or more of the following business functions: (1) configure, price, and quote; (2) contract generation and management; (3) revenue management (e.g., billing and financial reporting); and (4) product recommendations (e.g., identifying upsell and cross sell opportunities) and other machine learning recommendations to optimize the sales process.

As described in more detail below, a VR client computing device ("the VR Client") provides a VR user interface via which the user can log into a quote-to-cash system and initiate one of a plurality of quote-to-cash actions, such configuring a new product or requesting a quote for an asset-based order. In one embodiment, the VR Client is a computing device that a user wears to immerse him/herself in the VR scene. An example of a VR Client is the MICROSOFT HOLOLENS executing software that performs the functions described herein. In response to the user selecting a quote-to-cash action, the VR Client displays a VR scene with graphical images or UI elements that correspond to parameters of a quote-to-cash action request. The user is able to specify parameters for the quote-to-cash action by interacting with these images/elements in the VR scene. The VR Client then calls the quote-to-cash system with the specified parameters, as determined by the user's interaction with VR scene, and receives a quote-to-cash output from the quote-to-cash system.

Figure 1A:
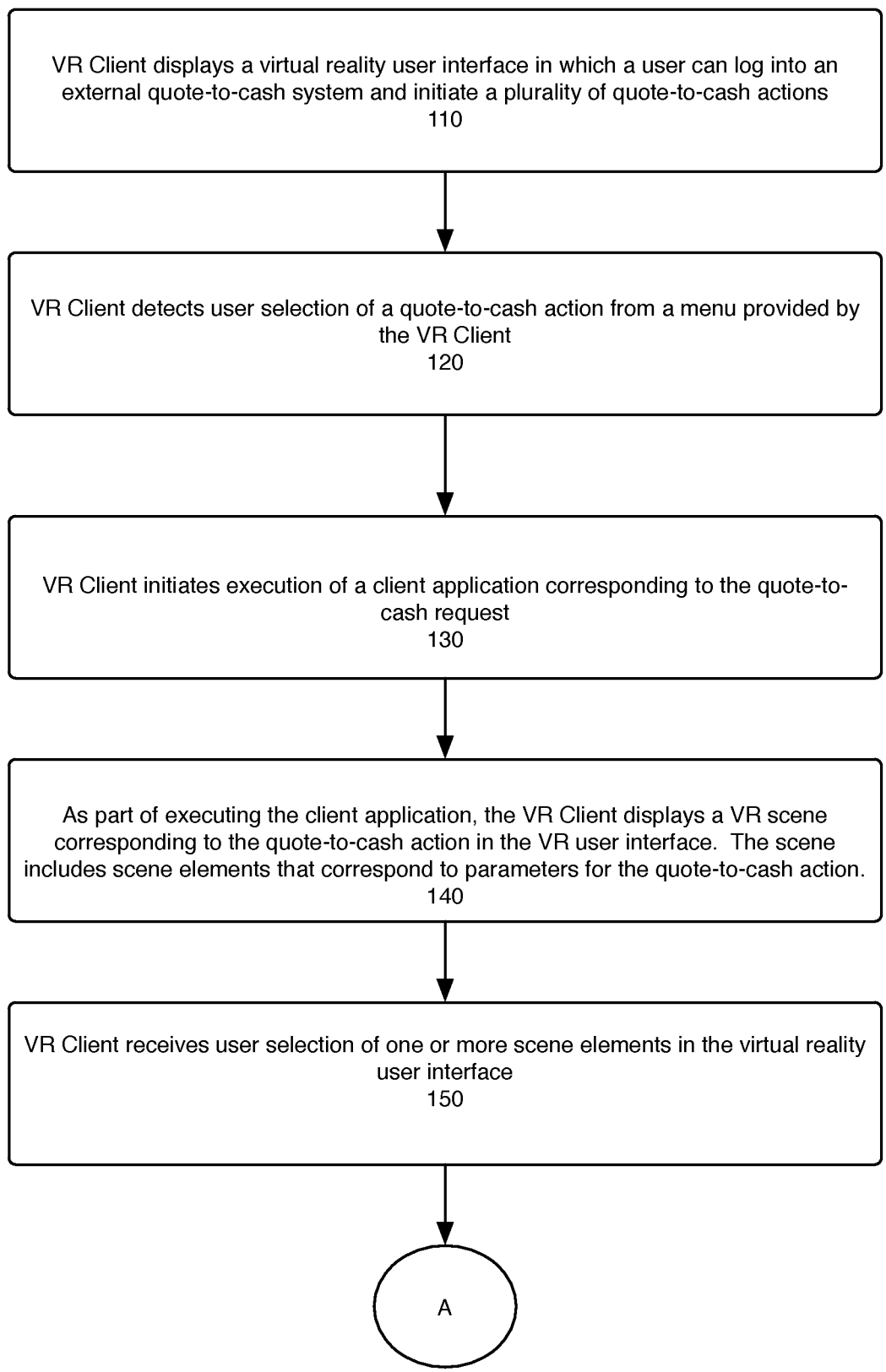
FIGS. 1A-B are flowcharts that illustrate a method, performed by a VR Client, for enabling a user to perform a quote-to-cash action by interacting with a VR scene.
Figure 1B:
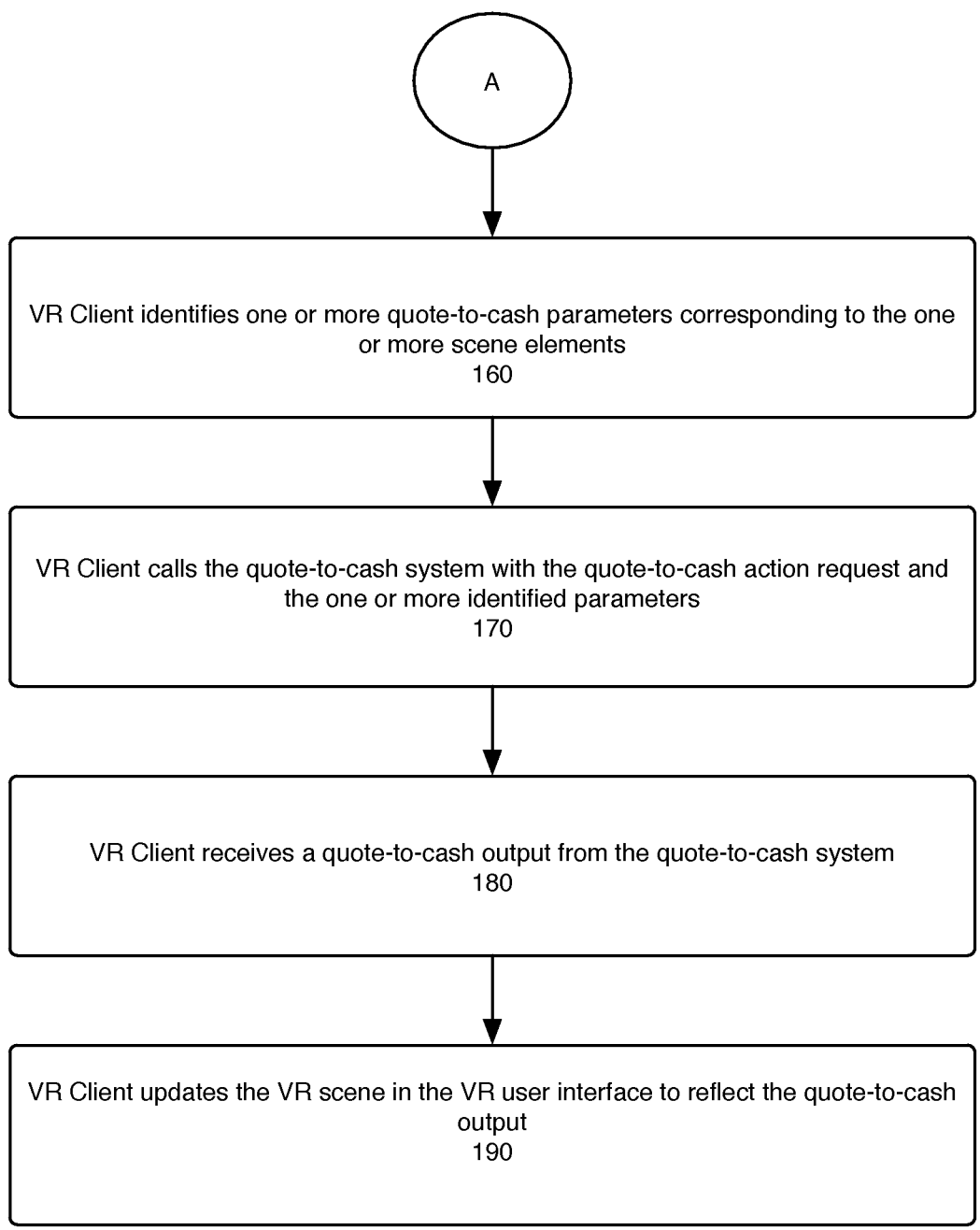

FIGS. 1A-B illustrate this method in more detail. The VR Client displays a virtual reality user interface in which a user can log into an external quote-to-cash system and initiate a plurality of quote-to-cash actions (step 110). In one embodiment, after the user logs in, the VR Clients displays a menu of quote-to-cash actions in the VR user interface. The menu options presented to the user depend on the quote-to-cash functionality to which the user has access.

In response to the user selecting a quote-to-cash action from the menu in the VR user interface, the VR Client initiates execution of applicable client application corresponding to the quote-to-cash action (steps 120, 130). The code in the client application species how a VR scene will be rendered initially and, subsequently, in response to user actions and receipt of output from the quote-to-cash system. In one embodiment, there is a separate client application for each type of quote-to-cash action available to the user. Furthermore, even for the same quote-to-cash action, there will be often different client applications for the different entities in the system, as the client applications will be tailored to serve each entity's business (e.g., an entity that sells bikes will see a different VR scene then one that sells industrial robots).

As part of executing the client application, the VR client device displays a VR scene corresponding to the quote-to-cash action in the VR user interface (step 140). The VR scene is a computer-generated three-dimensional image or environment for the quote-to-cash action in which the user is immersed using the VR client device. The user can virtually interact with the VR scene in a seemingly real/physical way using the VR client device.

The scene includes "scene elements" that correspond to parameters for the quote-to-cash action. A "scene element" is a 2D or 3D selectable (e.g., clickable) graphical image within the VR scene. The parameters to which the scene elements correspond are the possible variable values in a quote-to-cash action. For example, in a product configuration, the parameters are various product options available in the configuration. In an asset-based purchase order, the parameters are the previously-purchased assets. For each quote-to-cash action available to the user, the code in the client application corresponding to the action specifies the scene elements that are rendered for the action.

Figure 2A:
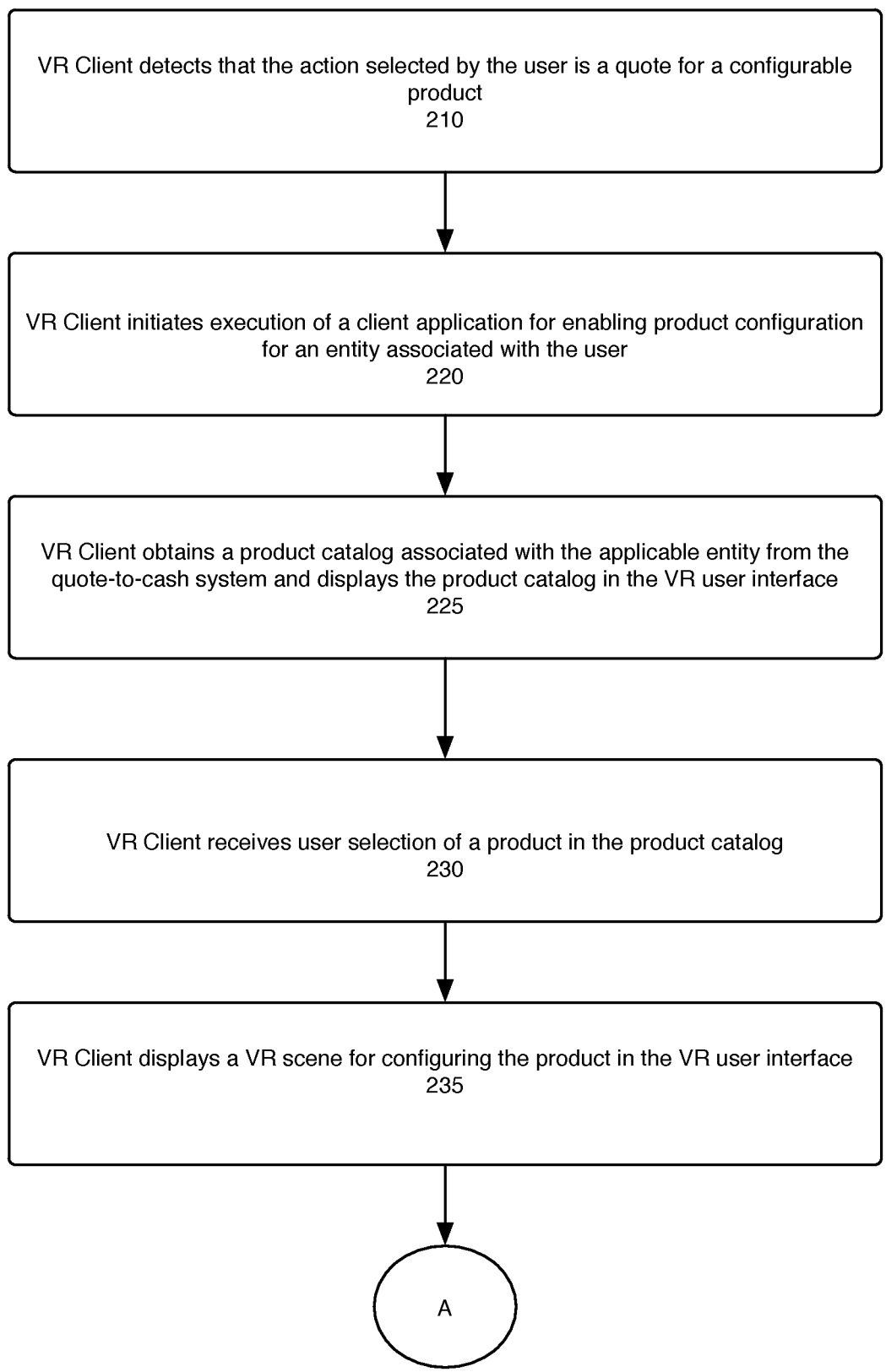
FIGS. 2A-D are flowcharts that illustrate an example implementation of the method of FIG. 1 in which the user selects a quote for a configurable product as the quote-to-cash action.
Figure 2B:
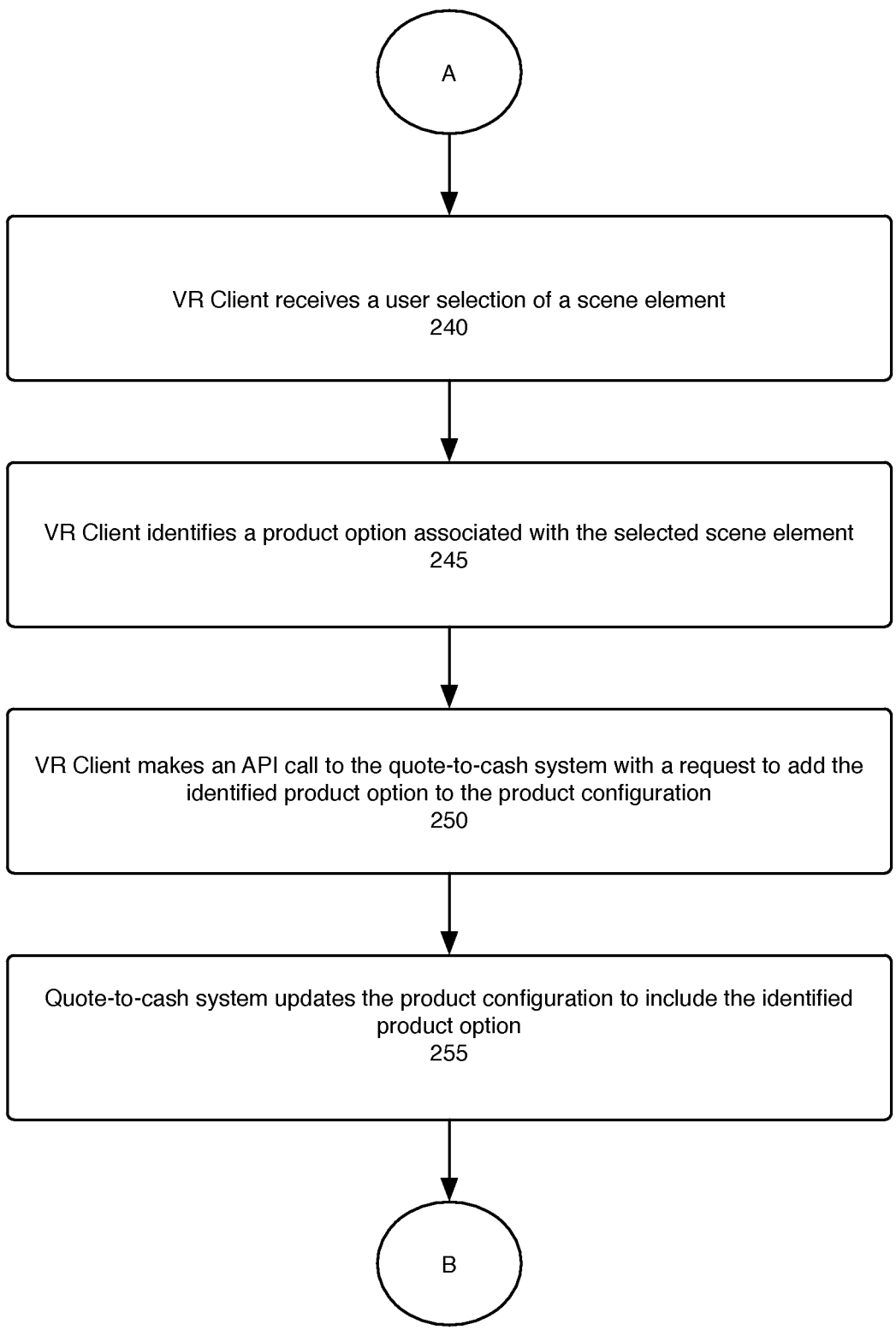
Figure 2C:
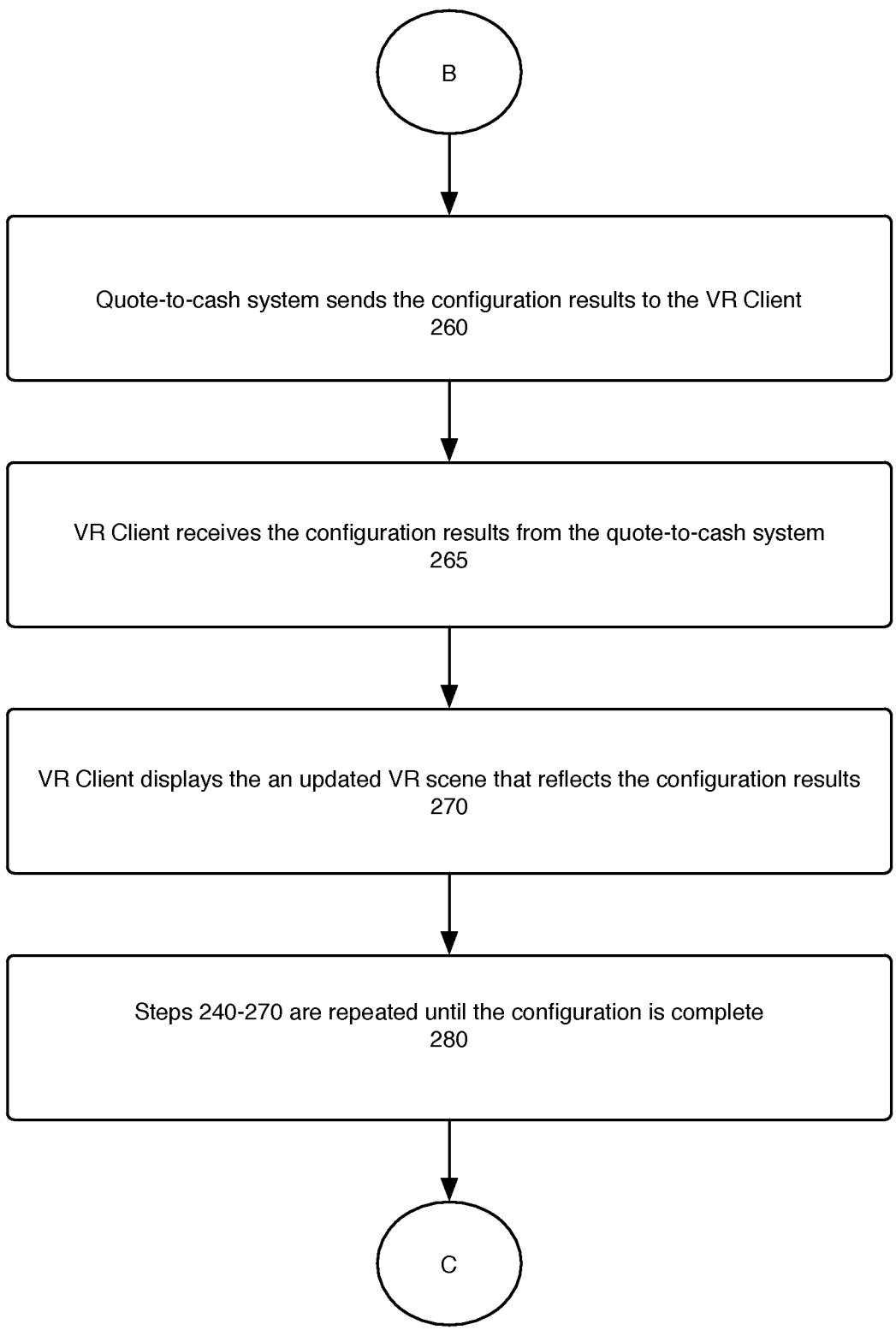
Figure 2D:
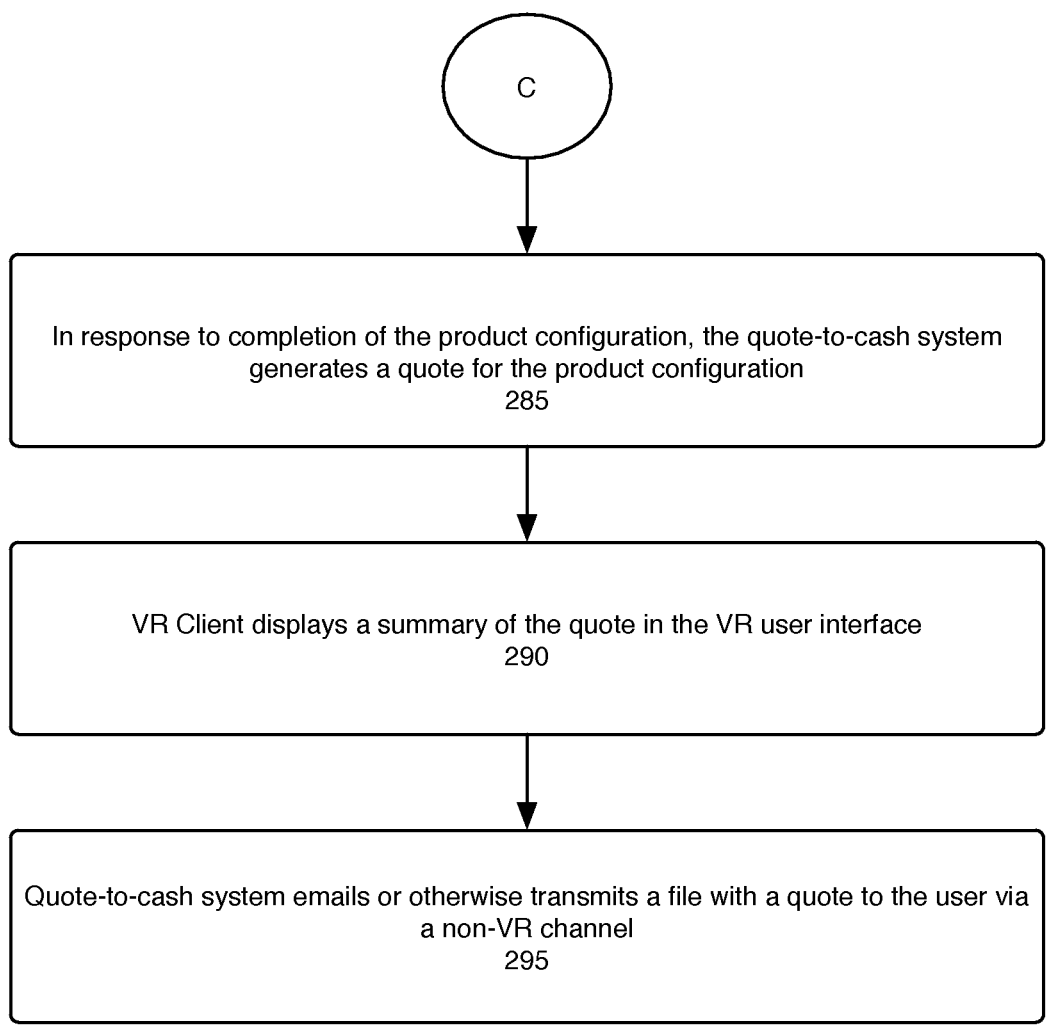

The user is able to select or otherwise interact with a scene element in the VR user interface using the VR Client. In response to the VR Client receiving a user selection of one or more scene elements, the VR Client device identifies one or more quote-to-cash parameters corresponding to the one or more scene elements based on a mapping of scene elements to parameters within the client application (steps 150, 160). The VR Client then calls the quote-to-cash system with a request for the quote-to-cash action, wherein the call includes the one or more identified parameters (step 170). For example, if the user is configuring a product, the VR Client device calls the quote-to-cash system with a configuration request and a product option corresponding to the selected scene element (see discussion of FIGS. 2A-2B below).

In one embodiment, the quote-to-cash system comprises a plurality of software modules that each handle different quote-to-cash functions (e.g., product configuration, pricing, contract generation and management, revenue management, etc.). In response to receiving the call, the quote-to-cash system executes the quote-to-cash module applicable to the request. In performing the request, the quote-to-cash system accesses data specific to the user's organization, such as price lists, configuration rules, customer data, etc.

The VR Client subsequently receives a quote-to-cash output from the quote-to-cash system (step 180). Examples of quote-to-cash outputs are configuration results, a quote summary, confirmation that a contract has been emailed, and approval of a quote. The VR Client updates the VR scene in the VR user interface to reflect the quote-to-cash system output (step 190). For example, the VR Client may display the current product configuration or a summary of a quote.

Depending on the quote-to-cash action, steps 140-190 may be performed iteratively until the quote-to-cash action is complete. For example, in the case of a product configuration, the steps are performed iteratively until the user has completed the product configuration.

FIGS. 2A-D an example implementation of the method of FIG. 1 in which the user selects a quote for a configurable product as the quote-to-cash action.

As discussed above, a user is able to see a menu of quote-to-cash actions in the VR user interface. In this example, the action selected by the user is a quote for a configurable product for a specified entity (step 210). Consequently, the VR Client initiates execution of a client application that enables configuration of products for an entity associated with the user (i.e., that enables the VR Client steps described below with respect to FIG. 2) (step 220). The VR Client also notifies the quote-to-cash system of the new configuration session, and the quote-to-cash system creates a new quote record and a unique cart ID for the configuration session. The unique cart ID is provided to the VR Client.

The VR Client obtains a product catalog associated with the applicable entity from the quote-to-cash system and displays the product catalog in the VR user interface (step 225). The product catalog may be displayed in the form of 3D images corresponding to the products in the catalog. For example, if the user's company sells bikes, the VR scene may display 3D images of the different types of bikes (e.g., road bike, mountain bike, cruiser bike) in the company's product catalog, along with a title or description of each bike. The user selects a bike for configuring from the catalog by selecting one of the 3D bike images.

In response to the user selecting a product from the product catalog, the VR Client displays a VR scene for configuring the product in the VR user interface (steps 230, 235). Scene elements in the product scene correspond to configurable product options. For example, if the user has selected a mountain bike for configuring, the VR scene may display a 3D image of the frame of the bike, which would be considered the base product. The VR scene would then have scene elements corresponding to the configurable parts of the bike, such as the wheels, handle bars, and seat. The scene elements might be selectable images of the different wheels, handle bars, and seats options.

In response to the VR Client receiving a user selection of a scene element, the VR Client identifies a product option associated with the selected scene element (steps 240, 245). The VR Client then makes an API call to the quote-to-cash system with a request to add the identified product option to the product configuration (step 250). In one embodiment, each product option is associated with an option ID, and client application executed by the VR Client accesses a mapping of scene elements to option IDs to obtain the option ID associated with the selected scene element. When the VR Client calls the quote-to-cash system, it provides the quoteto-cash system with the cart ID for the configured product and the option ID associated with the selected scene element.

In response to the API call, the quote-to-cash system updates the product configuration to include the identified product option (step 255). In updating the configuration, the quote-to-cash system may use configuration rules and a price list specific to the entity for which the quote is being created. The quote-to-cash system sends the configuration results to the VR Client (step 260). The configuration results may be an updated configuration that reflects the selected scene element, or it may be a notification that the selection violates configuration rules. If the configuration is valid, the configuration results include the current price.

The VR Client receives the configuration results from the quote-to-cash system (step 265). VR Client displays an updated VR scene that reflects the configuration results (step 270). If the configuration is valid, the VR scene is updated to show the selection of the product, and the current price. If the configuration is not valid, an error message is shown.

The client application executed by the VR scene specifies how the VR scene is updated in response to the selection of the scene element and the receipt of the configuration results. In the bike example above, if a user selected a type of handle bar (e.g., flat bars, mountain bars, or aero bars) and the selection was valid, then the 3D bike image in the VR scene may be updated to show the selected handle bars on the bike. The scene element corresponding to the selected handle bars may change color to indicate that the element was selected. There also may a text summary of the configuration (e.g., the name of the base product and the selected options) that would be updated to list the selected handle bars and the corresponding price.

Steps 240-270 are repeated until the configuration is complete (step 280). In response to completion of product configuration, quote-to-cash system generates a quote for the production configuration (step 285). It sends a summary of the quote to the VR Client (i.e., client name, product configuration, price, etc.), which displays the summary in the VR user interface (step 290). The quote-to-cash system emails or otherwise transmits a file with the quote to the user via a non-VR channel (step 295).

Figure 3A:
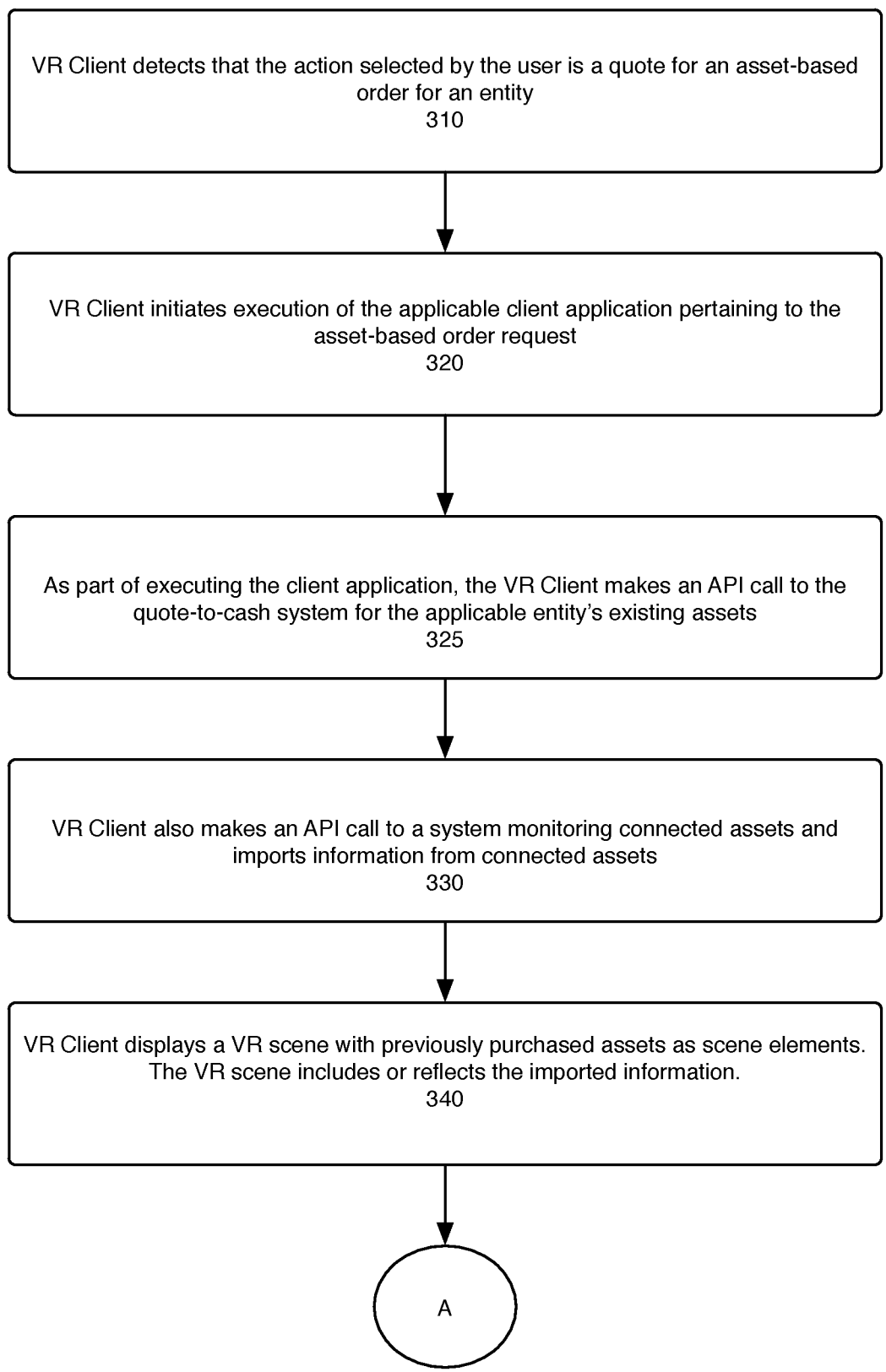
FIGS. 3A-C are flowcharts that illustrate an example implementation of the method of FIG. 1 in which the user selects an asset-based ordering as the quote-to-cash action
Figure 3B:
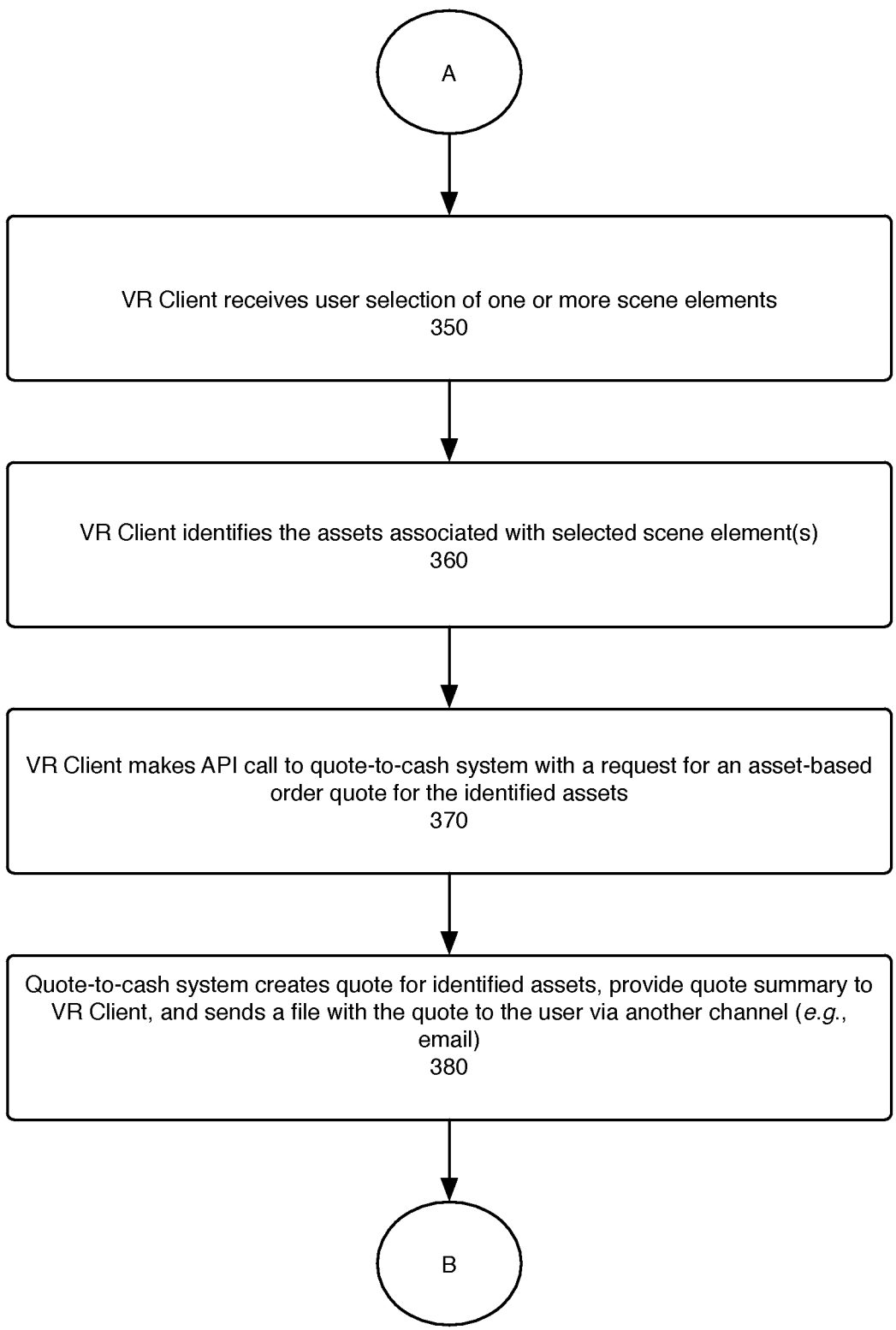
Figure 3C:
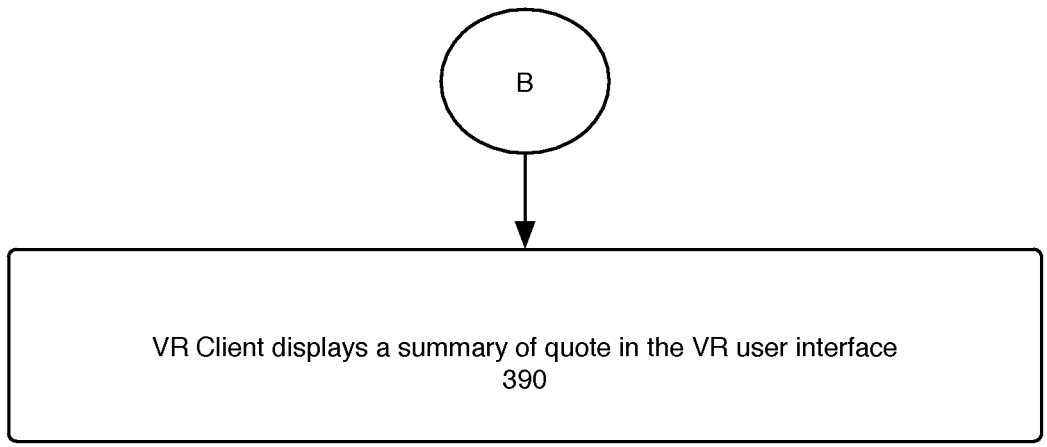

FIGS. 3A-B illustrate another example implementation of the method of FIG. 1 in which the user selects an asset-based ordering as the quote-to-cash action. Asset-based ordering involves ordering products based on existing assets (i.e., previously purchased products). Asset records are typically obtained from previous orders.

As discussed above, a user is able to see a menu of quote-to-cash actions in the VR user interface. In this example, the VR Client receives an indication that the user requests a quote for an asset-based order for an entity (step 310). The VR Client then initiates execution of the applicable client application pertaining to the asset-based order request (step 320).

As part of executing the client application, the VR Client makes an API call to the quote-to-cash system for the applicable entity's existing assets (step 325). The VR Client then imports information from connected assets (step 330). For example, the VR Client may make an API call to a system that monitors the assets. The VR Client displays a VR scene with previously-purchased assets as scene elements (340). The scene includes or reflects the imported information. For instance, if the previously-purchased assets are robots on a factory floor, the VR scene may depict an image of the factory floor with the robots, where a user can see information related to the operation of the robot in the VR user interface (e.g., parts that will need replacing, number of uses, etc.).

In response to the VR Client detecting that a user selected of one or more scene elements (step 350), the VR Client identifies the asset(s) associated with the selected scene element(s) (step 360). The VR Client then makes an API call to the quote-to-cash system with a request for an asset-based order quote for the identified assets (step 370).

In response to receiving the API call, the quote-to-cash system creates quote for the identified assets, provides a quote summary to VR Client, and sends a file with the quote to the user via another channel (e.g., email) (step 380). The VR Client displays a summary of quote in the VR user interface (step 390).

Figure 4:
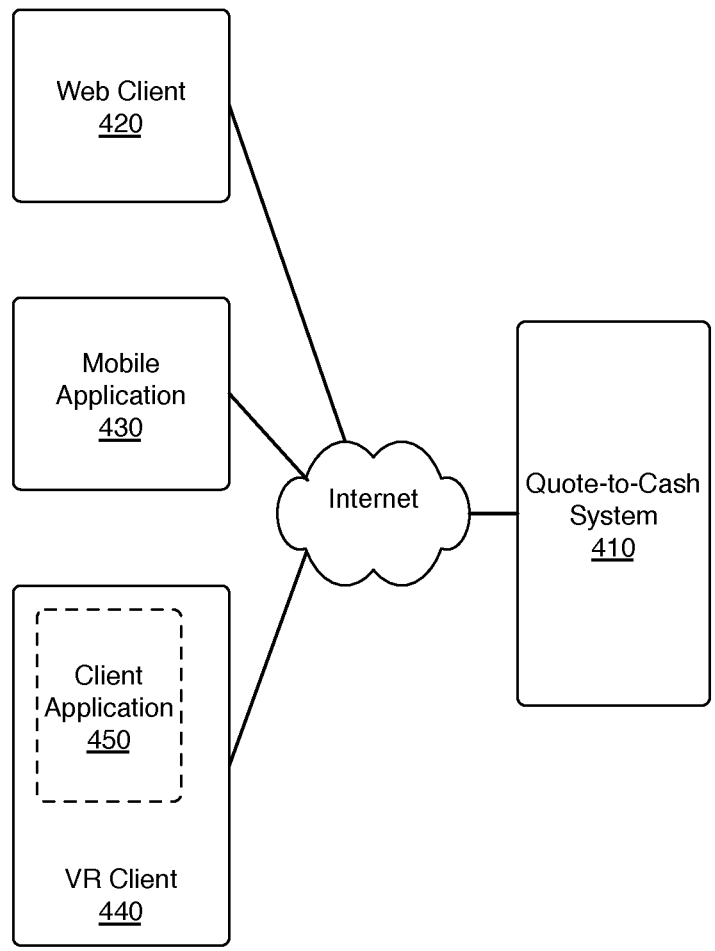
FIG. 4 is a block diagram that illustrates an example software architecture according to one embodiment.

FIG. 4 illustrates an example system architecture for performing the methods described herein. The methods described herein may be implemented in a system configured differently and are not limited to the system architecture illustrated in FIG. 4. Quote-to-cash system 410 executes software that provides quote-to-cash functionality. An example of a quote-to-cash system 410 is the APTTUS quote-to-cash suite of products running on the SALESFORCE platform. A user may interface with the quote-to-cash system via a web client 420, a mobile application 430, or via the VR Client 440. The VR Client executes a client application 450 that enables the VR Client to perform the functionality described herein. As stated above, the client application executed by the VR Client depends on the quote-to-cash action selected by the user. It may also depend on the entity associated with the user. In one embodiment, when a user logs in and selects a quote-to-cash action, the VC Client downloads the applicable VR Client application for the selected action and for the user from the quote-to-cash system 410.

The VR Client communicates with the quote-to-cash system 410 via an API to the quote-to-cash system. In some embodiments, the VR Client is capable of interfacing any one of a number of quote-to-cash systems, each running on different platforms. In such case, the VR Client communicates with the quote-to-cash system that serves the user's entity.

In certain embodiments, an intelligent software agent is integrated with the VR Client application and enables voice-guided parameter selection in the VR user interface. An example of an intelligent software agent is the Intelligent Software Agent described in U.S. patent application Ser. No. 15/484,594, titled "Quote-to-Cash Intelligent Software Agent," filed on Apr. 11, 2017, the contents of which are incorporated by reference as if fully described herein.

An example of a platform on which the client application may be developed is the UNITY Game Engine platform. In such case, a scene element may be implemented as a GameObject. In one embodiment, each scene element is associated with an object colluder that registers a user interaction with the scene element in the VR user interface. For example, it registers a click on the scene element. In one embodiment, each scene element is associated with a script (e.g., a C # script) in the client application that defines what happens in the VR scene when the user selects a scene element. The scene element may also be associated with routines (e.g., CoRoutines) that specify the API call that is made to the quote-to-cash system in response to the user selecting the scene element.

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for enabling a user to initiate a quote-to-cash system action and receive a quote-to-cash system output via a virtual reality user interface, the method comprising:
   providing a virtual reality user interface from which a user can log into a quote-to-cash system and initiate any one of a plurality of quote-to-cash action requests, wherein the virtual reality user interface is provided by a virtual reality client device that immerses a user in a virtual reality scene and enables the user to virtually interact with the virtual reality scene and wherein the virtual reality scene is a computer-generated three-dimensional image or environment for the quote-to-cash action;
   receiving a quote-to-cash action request from the user via the virtual reality user interface;
   rendering in the virtual reality user interface a virtual reality scene that corresponds to the quote-to-cash action request and that includes selectable scene elements, wherein the selectable scene elements are two-dimensional or three-dimensional selectable graphical images within the virtual reality user interface and wherein the selectable scene elements correspond to parameters for the quote-to-cash action request;
   receiving a user's selection of one or more scene elements in the virtual reality user interface;
   identifying one or more quote-to-cash parameters corresponding to the one or more selected scene elements;
   calling the quote-to-cash system with the quote-to-cash action request and the one or more identified quote-to-cash parameters;
   obtaining a quote-to-cash system output from the quote-to-cash system; and
   updating the rendered virtual reality scene in the virtual reality user interface to reflect the quote-to-cash system output.

2. The method of claim 1, wherein the plurality of quote-to-cash action requests include obtaining a quote for a product, receiving approval for a quote, requesting a contract, and asset-based ordering.

3. The method of claim 1, wherein, in response to the quote-to-cash action request being a request for a product quote, the rendering through updating steps comprise:
   rendering a virtual reality product scene for a product configuration in the virtual reality user interface, wherein the selectable scene elements in the product scene correspond to configurable product options;
   receiving a user's selection of a scene element in the virtual reality user interface;
   identifying a product option associated with the selected scene element;
   notifying the quote-to-cash system of the user's selection of the product option;
   receiving a configuration result from the quote-to-cash system; and
   updating the rendered virtual reality scene in the virtual reality user interface to reflect the configuration result.

4. The method of claim 3, further comprising:
   receiving an indication in the virtual reality user interface that the product configuration is complete;
   generating a quote for the product configuration in the quote-to-cash system;
   displaying a summary of the quote in the virtual reality user interface; and
   sending a file with the quote to the user via a non-virtual reality user interface.

5. The method of claim 1, wherein, in response to the quote-to-cash action request being an asset-based order request, the rendering through updating steps comprise:
   retrieving external information related to a plurality of previously-purchased assets, wherein the information is obtained from a system that monitors the operation of the assets;
   rendering a virtual reality scene with the previously-purchased assets as selectable scene elements, wherein the scene reflects the retrieved information;
   receiving a user's selection of one or more scene elements;
   identifying one or more assets corresponding to the one or more selected scene elements;
   calling the quote-to-cash system with the asset-based order request and the one or more identified assets;
   receiving a quote summary for the asset-based order request from the quote-to-cash system; and
   displaying the quote summary in the virtual reality user interface.

6. The method of claim 5, further comprising sending a file with the quote to the user via a non-virtual reality user interface.

7. A non-transitory computer-readable medium comprising a computer program, that, when executed by a computer system, enables the computer system to perform the following method for enabling a user to initiate a quote-to-cash system action and receive a quote-to-cash system output via a virtual reality user interface, the method comprising:
   providing a virtual reality user interface from which a user can log into a quote-to-cash system and initiate any one of a plurality of quote-to-cash action requests, wherein the virtual reality user interface is provided by a virtual reality client device that immerses a user in a virtual reality scene and enables the user to virtually interact with the virtual reality scene and wherein the virtual reality scene is a computer-generated three-dimensional image or environment for the quote-to-cash action;
   receiving a quote-to-cash action request from the user via the virtual reality user interface;
   rendering in the virtual reality user interface a virtual reality scene that corresponds to the quote-to-cash action request and that includes selectable scene elements, wherein the selectable scene elements are two-dimensional or three-dimensional selectable graphical images within the virtual reality user interface and wherein the selectable scene elements correspond to parameters for the quote-to-cash action request;
   receiving a user's selection of one or more scene elements in the virtual reality user interface;
   identifying one or more quote-to-cash parameters corresponding to the one or more selected scene elements;
   calling the quote-to-cash system with the quote-to-cash action request and the one or more identified quote-to-cash parameters;

obtaining a quote-to-cash system output from the quote-to-cash system; and updating the rendered virtual reality scene in the virtual reality user interface to reflect the quote-to-cash system output.

8. The non-transitory computer-readable medium of claim 7, wherein the plurality of quote-to-cash action requests include obtaining a quote for a product, receiving approval for a quote, requesting a contract, and asset-based ordering.

9. The non-transitory computer-readable medium of claim 7, wherein, in response to the quote-to-cash action request being a request for a product quote, the rendering through updating steps comprise:

rendering a virtual reality product scene for a product configuration in the virtual reality user interface, wherein the selectable scene elements in the product scene correspond to configurable product options;

receiving a user's selection of a scene element in the virtual reality user interface;

identifying a product option associated with the selected scene element;

notifying the quote-to-cash system of the user's selection of the product option;

receiving a configuration result from the quote-to-cash system; and updating the rendered virtual reality scene in the virtual reality user interface to reflect the configuration result.

10. The non-transitory computer-readable medium of claim 9, further comprising:

receiving an indication in the virtual reality user interface that the product configuration is complete;

generating a quote for the product configuration in the quote-to-cash system;

displaying a summary of the quote in the virtual reality user interface; and sending a file with the quote to the user via a non-virtual reality user interface.

11. The non-transitory computer-readable medium of claim 7, wherein, in response to the quote-to-cash action request being an asset-based order request, the rendering through updating steps comprise:

retrieving external information related to a plurality of previously-purchased assets, wherein the information is obtained from a system that monitors the operation of the assets;

rendering a virtual reality scene with the previously-purchased assets as selectable scene elements, wherein the scene reflects the retrieved information;

receiving a user's selection of one or more scene elements;

identifying one or more assets corresponding to the one or more selected scene elements;

calling the quote-to-cash system with the asset-based order request and the one or more identified assets;

receiving a quote summary for the asset-based order request from the quote-to-cash system; and displaying the quote summary in the virtual reality user interface.

12. The non-transitory computer-readable medium of claim 11, further comprising sending a file with the quote to the user via a non-virtual reality user interface.

13. A computer system for enabling a user to initiate a quote-to-cash system action and receive a quote-to-cash system output via a virtual reality user interface, the system comprising:

one or more processors;

one or more memory units coupled to the one or more processors, wherein the one or more memory units store instructions that, when executed by the one or more processors, cause the system to perform the operations of:

providing a virtual reality user interface from which a user can log into a quote-to-cash system and initiate any one of a plurality of quote-to-cash action requests, wherein the virtual reality user interface is provided by a virtual reality client device that immerses a user in a virtual reality scene and enables the user to virtually interact with the virtual reality scene and wherein the virtual reality scene is a computer-generated three-dimensional image or environment for the quote-to-cash action;

receiving a quote-to-cash action request from the user via the virtual reality user interface;

rendering in the virtual reality user interface a virtual reality scene that corresponds to the quote-to-cash action request and that includes selectable scene elements, wherein the selectable scene elements are two-dimensional or three-dimensional selectable graphical images within the virtual reality user interface and wherein the selectable scene elements correspond to parameters for the quote-to-cash action request;

receiving a user's selection of one or more scene elements in the virtual reality user interface;

identifying one or more quote-to-cash parameters corresponding to the one or more selected scene elements;

calling the quote-to-cash system with the quote-to-cash action request and the one or more identified quote-to-cash parameters;

obtaining a quote-to-cash system output from the quote-to-cash system; and updating the rendered virtual reality scene in the virtual reality user interface to reflect the quote-to-cash system output.

14. The system of claim 13, wherein the plurality of quote-to-cash action requests include obtaining a quote for a product, receiving approval for a quote, requesting a contract, and asset-based ordering.

15. The system of claim 13, wherein, in response to the quote-to-cash action request being a request for a product quote, the rendering through updating steps comprise:

rendering a virtual reality product scene for a product configuration in the virtual reality user interface, wherein the selectable scene elements in the product scene correspond to configurable product options;

receiving a user's selection of a scene element in the virtual reality user interface;

identifying a product option associated with the selected scene element;

notifying the quote-to-cash system of the user's selection of the product option;

receiving a configuration result from the quote-to-cash system; and updating the rendered virtual reality scene in the virtual reality user interface to reflect the configuration result.

16. The system of claim 15, further comprising:

receiving an indication in the virtual reality user interface that the product configuration is complete;

generating a quote for the product configuration in the quote-to-cash system;

displaying a summary of the quote in the virtual reality user interface; and sending a file with the quote to the user via a non-virtual reality user interface.

17. The system of claim 13, wherein, in response to the quote-to-cash action request being an asset-based order request, the rendering through updating steps comprise:
- retrieving external information related to a plurality of previously-purchased assets, wherein the information is obtained from a system that monitors the operation of the assets;
- rendering a virtual reality scene with the previously-purchased assets as selectable scene elements, wherein the scene reflects the retrieved information;
- receiving a user's selection of one or more scene elements;
- identifying one or more assets corresponding to the one or more selected scene elements;
- calling the quote-to-cash system with the asset-based order request and the one or more identified assets;
- receiving a quote summary for the asset-based order request from the quote-to-cash system; and
- displaying the quote summary in the virtual reality user interface.

18. The system of claim 17, further comprising sending a file with the quote to the user via a non-virtual reality user interface.

* * * * *